(12) United States Patent
Want et al.

(10) Patent No.: US 8,081,612 B2
(45) Date of Patent: Dec. 20, 2011

(54) DEVICE, SYSTEM, AND METHOD OF SELECTIVELY ACTIVATING A WIRELESS NETWORK CONNECTION

(75) Inventors: Roy Want, Los Altos, CA (US); Trevor Pering, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 1025 days.

(21) Appl. No.: 11/967,341

(22) Filed: Dec. 31, 2007

(65) Prior Publication Data

US 2009/0170554 A1 Jul. 2, 2009

(51) Int. Cl.
*H04W 4/00* (2009.01)
(52) U.S. Cl. ............... 370/338; 455/422.1; 455/450; 455/11.1; 455/41.2; 370/315; 370/328
(58) Field of Classification Search ............... 455/422.1, 455/450, 451, 452.1, 452.2, 11.1, 41.2; 370/315, 370/328, 329, 338
See application file for complete search history.

(56) References Cited

U.S. PATENT DOCUMENTS

| | | | | |
|---|---|---|---|---|
| 7,656,849 | B1 * | 2/2010 | Evans | 370/338 |
| 2004/0147223 | A1 * | 7/2004 | Cho | 455/41.2 |
| 2007/0041345 | A1 * | 2/2007 | Yarvis et al. | 370/331 |
| 2008/0057956 | A1 * | 3/2008 | Black et al. | 455/435.1 |
| 2010/0284388 | A1 * | 11/2010 | Fantini et al. | 370/338 |

* cited by examiner

*Primary Examiner* — Vladimir Magloire
(74) *Attorney, Agent, or Firm* — Kacvinsky Daisak, PLLC

(57) ABSTRACT

Device, system, and method of selectively activating a wireless network connection. In some demonstrative embodiments, a mobile device may include a wireless network communication unit capable of communicating with an access-point over a wireless network connection; a personal-area-network communication unit capable of communicating with one or more other mobile devices over one or more wireless personal-area-network connections, respectively; and a communication controller to mediate communications between the mobile devices and the access point when the wireless network connection is active, and to communicate with the access-point via at least one of the personal-area-network connections when the wireless network connection is not active. Other embodiments are described and claimed.

15 Claims, 3 Drawing Sheets

DEVICE, SYSTEM, AND METHOD OF SELECTIVELY ACTIVATING A WIRELESS NETWORK CONNECTION

BACKGROUND

A mobile device may include a Wireless Local-Area-Network (WLAN) communication unit to communicate with an Access-Point (AP) of a WLAN, e.g., a mobile hotspot; and a Personal-Area-Network (PAN) communication unit to locally communicate with one or more peripheral devices, e.g., mice, keyboards, or displays, and the like.

In order to maintain a connection to the WLAN, the mobile device must keep the WLAN communication unit active, which may consume a relatively large amount of power. In order to reduce power consumption, a user of the mobile device may manually disable the WLAN communication unit. However, disabling the WLAN communication unit will result in disconnecting the mobile device from the WLAN.

Some mobile devices implement power-save modes to significantly reduce power consumption. However, even the power-save modes may require the WLAN communication unit to be at least partially active, e.g., to employ a carrier-sense multiple-access (CSMA) mechanism.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
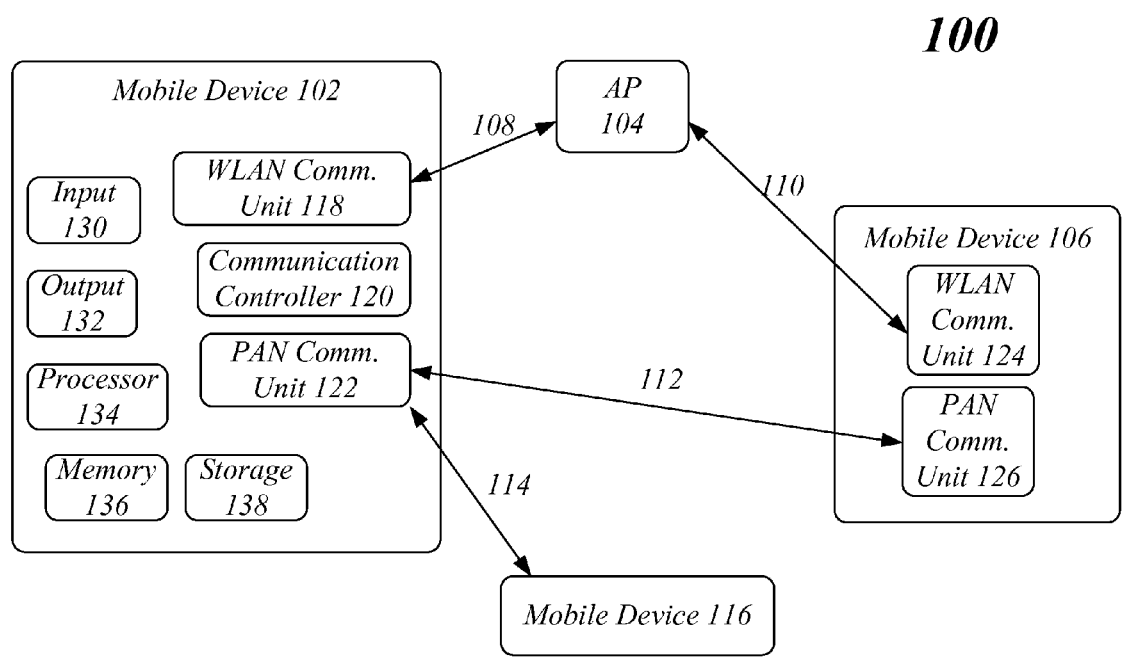
FIG. 1 is a schematic block diagram illustration of a system in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality" as used herein include, for example, "multiple" or "two or more". For example, "a plurality of items" includes two or more items.

Although portions of the discussion herein relate, for demonstrative purposes, to wired links and/or wired communications, embodiments of the invention are not limited in this regard, and may include one or more wired or wireless links, may utilize one or more components of wireless communication, may utilize one or more methods or protocols of wireless communication, or the like. Some embodiments may utilize wired communication and/or wireless communication.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating in accordance with existing IEEE 802.11, 802.11a, 802.11b, 802.11g, 802.11n, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

Some embodiments may be used in conjunction with one or more types of wireless communication signals and/or systems, for example, Radio Frequency (RF), Infra Red (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee(™), Ultra-Wideband (UWB), Global System for Mobile communication (GSM), 2G, 2.5G, 3G, 3.5G, Enhanced Data rates for GSM Evolution (EDGE), or the like. Other embodiments may be used in various other devices, systems and/or networks.

Reference is made to FIG. 1, which schematically illustrates a block diagram of a system 100 in accordance with some demonstrative embodiments.

System 100 includes, for example, a plurality of mobile devices, e.g., mobile devices 102, 106 and/or 116.

Mobile devices 102, 106 and 116 include, for example, a laptop computer, a notebook computer, a tablet computer, a PDA device, a cellular phone, a mobile phone, a hybrid device, e.g., combining cellular phone functionalities with PDA device functionalities, a relatively small computing device, a "smart-phone", a non-desktop computer, a portable device, a handheld device, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, or the like.

In some demonstrative embodiments, system 100 may also include an Access-Point (AP), e.g., a mobile hotspot, to communicate with one or more of mobile devices 102, 106 and/or 116 over a wireless network, e.g., a WLAN or a WWAN. For example, one or more of mobile devices 102, 106 and 116 may include a WLAN or WWAN communication module to communicate with AP 104 over one or more wireless LAN or WWAN connections. In one example, mobile device 102 may include a WLAN communication unit 118 capable of communicating with AP 104 over a WLAN connection 108; and mobile device 106 may include a WLAN communication unit 124 capable of communicating with AP 104 over a WLAN connection 110. In one example, WLAN communication units 118 and 124 may include a radio unit in accordance with "IEEE-Std 802.11, 1999 Edition (ISO/IEC 8802-11: 1999)" standard ("the IEEE 802.11 standard"), and more particularly "IEEE-Std 802.11n Supplement to ANSI/IEEE Std 802.11, September 1999, Standard for Enhancements for Higher Throughput" ("the IEEE 802.11n standard"). In another example, WLAN communication units 118 and 124 may include any other suitable WLAN hardware and/or software, e.g., in accordance with "IEEE Std 802.11b-1999," Part 11: Wireless LAN medium access control (MAC) and physical layer (PHY) specifications: High-speed physical layer extension in the 2.4 GHz band, Supplement to ANSI/IEEE Std 802.11, September 1999" ("the IEEE 802.11b standard").

In some demonstrative embodiments mobile devices 102, 106 and 116 may be capable of communicating with one another over one or more PAN connections. For example, mobile device 102 may include a PAN communication unit 122, and mobile device 106 may include a PAN communication unit 126 to communicate with one another over a PAN connection 112. Mobile device 102 may also communicate with mobile device 116, for example, over a PAN connection 114. PAN communication units 122 and/or 126 may include, for example, a UWB communication unit, and/or any other suitable Pan hardware and/or software, e.g., a Bluetooth communication unit.

Mobile devices 102, 106 and/or 116 include, for example, a processor 134; an internal memory 136, e.g., a Random Access Memory (RAM); an internal storage 138, e.g., a hard disk drive; an integrated input unit 130, e.g., a keyboard and/or a touch-pad integrated within a housing or body of mobile device 102; and/or an integrated output 132, e.g., a display or screen.

In some demonstrative embodiments, WLAN communication units 118 and/or 124 may have relatively high power consumption compared, for example, to PAN communication units 122 and/or 126, respectively.

In some demonstrative embodiments, mobile devices 102, 106 and/or 116 may be capable of conserving power by sharing WLAN connections 108 and/or 110, for example, by selectively maintaining a single WLAN connection, e.g., connection 108 or 110, to AP 104, while using PAN connections 112 and/or 114 to maintain connectivity between mobile devices 102, 106 and 116, e.g., as described below.

In some demonstrative embodiments, a mobile device of mobile devices 102, 106 and 116 ("the master mobile device") may maintain a LAN connection to AP 104. At least one other mobile device ("the slave mobile device") may communicate with AP 104 via a respective PAN connection with the master mobile device, while the master mobile device mediates communications between the slave mobile device and AP 104, e.g., as described below. Accordingly, the slave mobile device may de-activate its LAN communication unit, e.g., as described below.

In some demonstrative embodiments, the slave mobile device may selectively activate the LAN communication unit to directly communicate with AP 104, e.g., if the slave mobile device requires a high-bandwidth channel to AP 104. In one example, the slave mobile device may act as a slave device communicating with AP 104 via the PAN connection with the master mobile device, e.g., when a user of the mobile device is casually browsing web pages. The slave mobile device may switch to communicate directly with AP 104 via a direct LAN connection, e.g., when starting a file download, thereby switching to act as a second master mobile device. The first master mobile device may switch to communicate with AP 104 via the second master mobile device, e.g., if the first master mobile device does not actively need its LAN connection. In another example, a group of mobile devices, e.g., a group including mobile devices 102, 106 and/or 116, may cooperatively rotate a designation of a mobile device of the group to act as the master mobile device, e.g., in order to distribute the power savings among the mobile devices of the group.

In some demonstrative embodiments, mobile device 102 may include a communication controller 120 to mediate communications between mobile device 106 and/or 116 and AP 104, e.g., when WLAN connection 108 is active; and to communicate with AP 104 via at least one of PAN connections 112 and 114 when WLAN connection 108 is not active. Communication controller 120 may be implemented using any suitable software and/or hardware. For example, communication controller 120 may be implemented as part of a Media-Access-Controller (MAC) and/or a Physical layer (PHY) of mobile device 102.

In some demonstrative embodiments, mobile device 102 may selectively activate or de-activate WLAN connection 108, e.g., by powering-on or powering-off WLAN communication unit 118, based on a bandwidth of an intended communication between mobile device 102 and AP 104 ("the required bandwidth").

In some demonstrative embodiments, mobile device 102 may activate WLAN connection 108 if the required bandwidth is greater than a bandwidth of PAN connections 112 and/or 114. For example, communication controller 120 may power-on WLAN communication unit 118 in order to activate WLAN connection 108.

In some demonstrative embodiments, mobile device 102 may de-activate WLAN connection 108 if the required bandwidth is lower than the bandwidth of PAN connections, e.g., 112 and/or 114. For example, communication controller 120 may power-off WLAN communication unit 118 in order to de-activate WLAN connection 108.

In some demonstrative embodiments, mobile device 102 may communicate with AP 104 via mobile device 106, for example, mobile device 106 may act as a master mobile device communicating with AP 104 via WLAN connection 110, and mobile device 102 may communicate with mobile device 106 via PAN connection 112, e.g., when WLAN connection 108 is not active. Mobile device 102 may activate WLAN connection 108 to communicate directly with AP 104. When WLAN connection 108 is active, mobile device 102 may mediate communications between mobile devices 106 and 114 and AP 104 over WLAN connection 108.

Figure 2C:
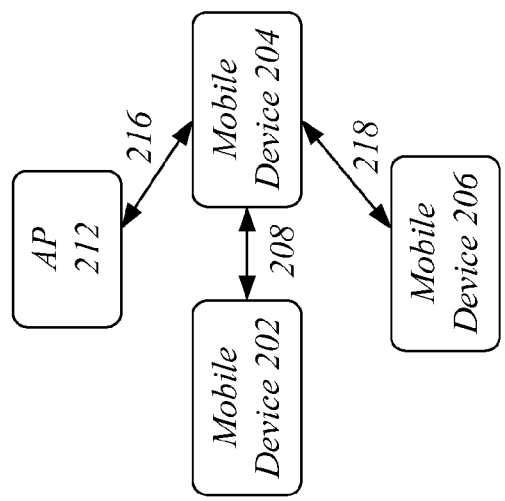
FIGS. 2A, 2B, and 2C are a sequence of three respective communication schemes, in accordance with some demonstrative embodiments.
Figure 2B:
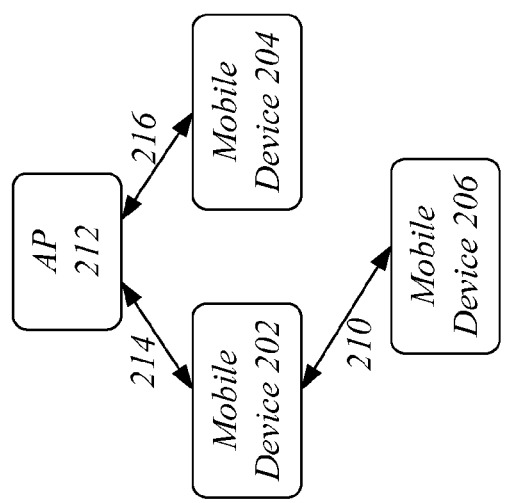
Figure 2A:
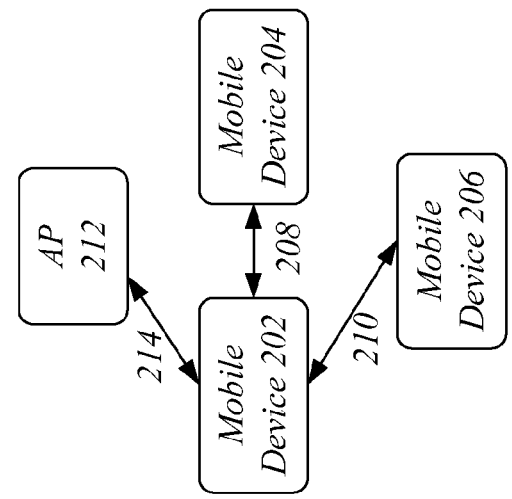

Reference is now made to FIGS. 2A, 2B and 2C, which illustrate a sequence of three respective communication schemes, in accordance with some demonstrative embodiments.

As shown in FIG. 2A, a first mobile device 202 may communicate with an AP 212 via a WLAN connection 214. Mobile device 202 may act as a master mobile device to mediate communications between AP 212 and a second mobile device 204 and a third mobile device 206. Mobile device 204 may communicate with mobile device 202 via a PAN connection 208, and mobile device 206 may communicate with mobile device 202 via a PAN connection 210. A WLAN communication unit of mobile device 204 and/or mobile device 206 may be powered-off.

As shown in FIG. 2B, mobile device 204 may power-on the WLAN communication unit of mobile device 204 to activate a direct WLAN connection 216 with communicate with AP 212, e.g., to ensure a high-bandwidth link to the internet. Mobile device 202 may continue communicating with AP 212 via WLAN connection 214, and/or to mediate communications between mobile device 206 and AP 212.

As shown in FIG. 2C, mobile device 202 may power-off the WLAN communication unit of mobile device 202, e.g., to conserve power. Mobile device 204 may act as the master mobile device to mediate communications between AP 212 and mobile devices 202 and 206. For example, mobile device 202 may communicate with mobile device 204 via PAN connection 208, and mobile device 206 may communicate with mobile device 204 via a PAN connection 218.

Figure 3:
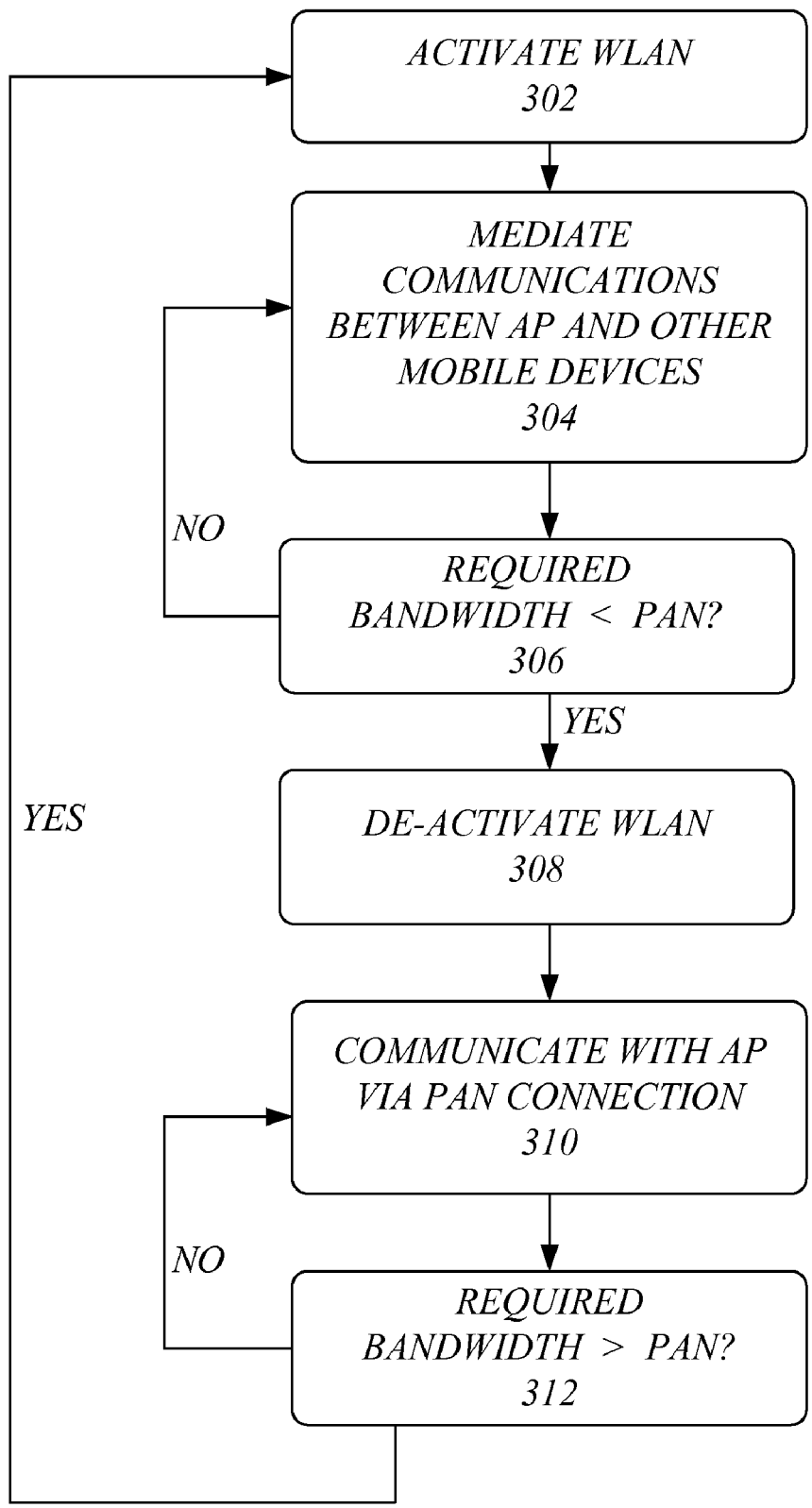
FIG. 3 is a schematic flow-chart illustration of a method of selectively activating a wireless network connection in accordance with some demonstrative embodiments.

Reference is now made to FIG. 3, which schematically illustrates a method of FIG. 3 is a selectively activating a wireless network connection in accordance with some demonstrative embodiments. In some non-limiting embodiments, one or more operations of FIG. 3 may be performed by mobile devices 102 (FIG. 1), 106 (FIG. 1) and/or 116 (FIG. 1).

As indicated at block 304, the method may include using a mobile device to mediate communications between one or more other mobile devices and an AP by communicating with the AP over a WLAN connection and communicating with the one or more mobile devices over one or more PAN connections, respectively.

In some demonstrative embodiments, the method of may include selectively activating or de-activating the WLAN connection based on a bandwidth of an intended communication between the mobile device and the AP, e.g., as described below.

As indicated at block 306, the method may include determining whether the required bandwidth is lower than a bandwidth of the PAN connections.

As indicated at block 308, the method may include de-activating the WLAN connection, e.g., if the required bandwidth is lower than the bandwidth of the PAN connections.

As indicated at block 310, the method may include communicating with the AP via at least one of the PAN connections, e.g., when the WLAN connection is not active.

As indicated at block 312, the method may include determining whether the required bandwidth is greater than a bandwidth of the PAN connections.

As indicated at block 302, the method may include activating the WLAN connection if the required bandwidth is greater than the bandwidth of the PAN connections.

Other operations or sets of operations may be used in accordance with some embodiments.

Some embodiments, for example, may take the form of an entirely hardware embodiment, an entirely software embodiment, or an embodiment including both hardware and software elements. Some embodiments may be implemented in software, which includes but is not limited to firmware, resident software, microcode, or the like.

Furthermore, some embodiments may take the form of a computer program product accessible from a computer-usable or computer-readable medium providing program code for use by or in connection with a computer or any instruction execution system. For example, a computer-usable or computer-readable medium may be or may include any apparatus that can contain, store, communicate, propagate, or transport the program for use by or in connection with the instruction execution system, apparatus, or device.

In some embodiments, the medium may be an electronic, magnetic, optical, electromagnetic, infrared, or semiconductor system (or apparatus or device) or a propagation medium. Some demonstrative examples of a computer-readable medium may include a semiconductor or solid state memory, magnetic tape, a removable computer diskette, a random access memory (RAM), a read-only memory (ROM), a rigid magnetic disk, and/or an optical disk. Some demonstrative examples of optical disks include compact disk-read only memory (CD-ROM), compact disk-read/write (CD-R/W), and DVD.

In some embodiments, a data processing system suitable for storing and/or executing program code may include at least one processor coupled directly or indirectly to memory elements, for example, through a system bus. The memory elements may include, for example, local memory employed during actual execution of the program code, bulk storage, and cache memories which may provide temporary storage of at least some program code in order to reduce the number of times code must be retrieved from bulk storage during execution.

In some embodiments, input/output or I/O devices (including but not limited to keyboards, displays, pointing devices, etc.) may be coupled to the system either directly or through intervening I/O controllers. In some embodiments, network adapters may be coupled to the system to enable the data processing system to become coupled to other data processing systems or remote printers or storage devices, for example, through intervening private or public networks. In some embodiments, modems, cable modems and Ethernet cards are demonstrative examples of types of network adapters. Other suitable components may be used.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. A mobile device comprising:
   a wireless network communication unit capable of communicating with an access-point over a wireless network connection;
   a personal-area-network communication unit capable of communicating with one or more other mobile devices over one or more wireless personal-area-network connections; and
   a communication controller to selectively activate or de-activate the wireless network connection based on a bandwidth of an intended communication between the mobile device and the access point, to mediate communications between said mobile device and said access point and between said one or more other mobile devices and said access point when said wireless network connection is active, and to communicate with said access-point via the one or more other mobile devices over the at least one of said personal-area-network connections when said wireless network connection is not active.

2. The mobile device of claim 1, wherein said wireless network communication unit comprises a local-area-network communication unit, and wherein said wireless network connection comprises a wireless local-area-network connection.

3. The mobile device of claim 2, wherein said mobile device is to selectively activate or de-activate said wireless local-area-network connection based on a bandwidth of an intended communication between said mobile device and said access-point.

4. The mobile device of claim 2, wherein said mobile device is to power off said local-area-network communication unit when communicating with said access-point via said personal-area-network connections.

5. The mobile device of claim 1, wherein a bandwidth of said wireless network connection is greater than a bandwidth of said personal-area-network connection, and wherein a power consumption of said mobile device, when communicating with said access-point via said personal-area-connection, is lower than a power consumption of said mobile device, when communicating with the access-point via the wireless network connection.

6. The mobile device of claim 1, wherein said one or more other mobile devices comprise first and second mobile devices, and wherein said mobile device is to communicate with said access-point via said first mobile device, activate said wireless network connection to communicate directly with said access-point, and mediate communications between said first and second mobile devices and said access point over said wireless network connection.

7. The mobile device of claim 1, wherein said one or more personal-area-network connections comprise an ultra-wide-band connection.

8. The mobile device of claim 1, wherein said mobile device comprises a device selected from the group consisting of: a cellular phone, a handheld device, a wireless communication device, and a personal-digital-assistant device, a smart phone, and ultra-mobile-device.

9. A method comprising:
   selectively activating or de-activating a wireless network connection based on a bandwidth of an intended communication between a mobile device and an access point;
   mediating communications between the mobile device and the access point and between one or more other mobile devices and the access point by communicating with said access-point over the wireless network connection when the connection is active; and
   when said wireless network connection is not active, communicating with said access-point via the one or more other mobile device over at least one of said personal-area-network connections.

10. The method of claim 9, wherein said wireless network connection comprises a wireless local-area-network connection.

11. The method of claim 10 comprising selectively activating or de-activating said wireless local-area-network connection based on a bandwidth of an intended communication between said mobile device and said access-point.

12. The method of claim 10 comprising powering off said local-area-network communication unit when communicating with said access-point via said personal-area-network connections.

13. The method of claim 9, wherein a bandwidth of said wireless network connection is greater than a bandwidth of said personal-area-network connection, and wherein a power consumption when communicating with said access-point via said personal-area-connection, is lower than a power consumption, when communicating with the access-point via the wireless network connection.

14. The method of claim 9, wherein said one or more other mobile devices comprise first and second mobile devices, the method comprising:
   communicating with said access-point via said first mobile device; activating said wireless network connection to communicate directly with said access-point; and
   mediating communications between said access point and said first and second mobile devices over said wireless network connection.

15. The method of claim 9, wherein said mobile device comprises a device selected from the group consisting of: a cellular phone, a handheld device, a wireless communication device, and a personal-digital-assistant device, a smart phone, and ultra-mobile-device.

* * * * *